United States Patent Office 2,803,588
Patented Aug. 20, 1957

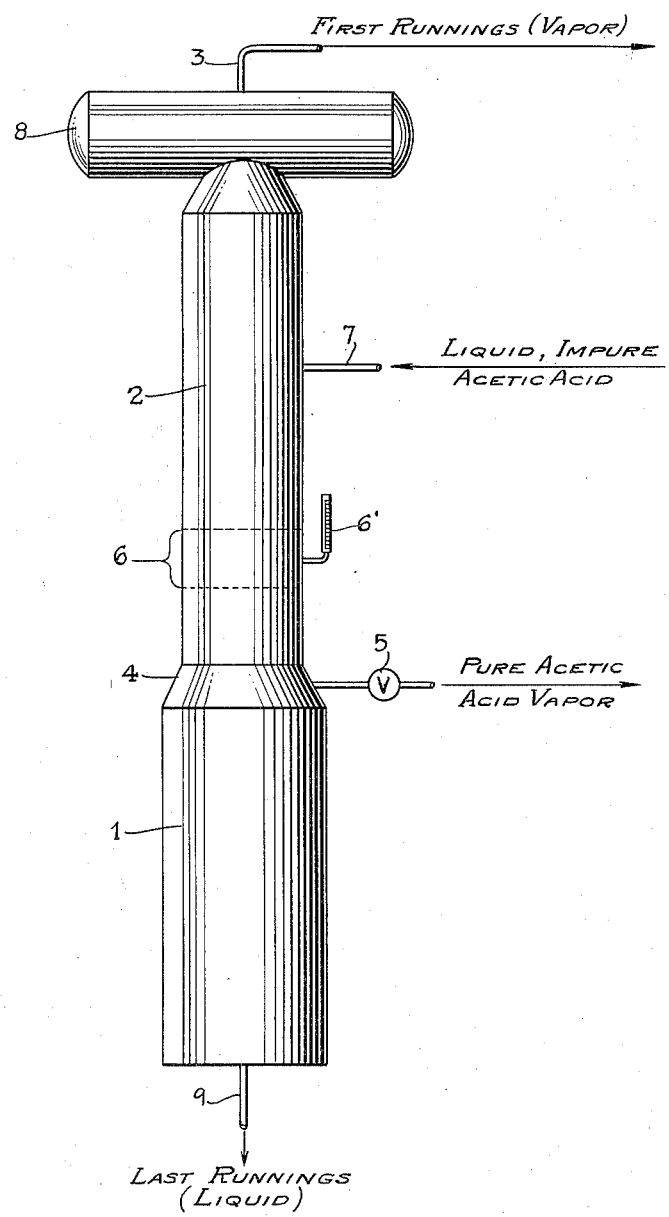

2,803,588
DISTILLATION PROCESS FOR MAKING PURE ACETIC ACID

Ferdinand Gerstner and Josef Wimmer, Burghausen, Germany, assignors to Wacker-Chemie G. m. b. H., Munich, Germany, a corporation of Germany Application May 23, 1955, Serial No. 510,547

Claims priority, application Germany June 19, 1954

2 Claims. (Cl. 202—52)

This invention relates, generally, to processes for manufacturing acetic acid and, more particularly, it is concerned with an improved method for making this substance in a state of high purity, such as is required for use in the manufacture of medicines, in foods such as edible vinegars and the like, and in the manufacture of other products wherein acetic acid of highest purity is a component or is utilized as an intermediate.

Acetic acid, as an article of commerce, is commonly available in two forms: glacial acetic acid, which contains not less than about 99.5% acetic acid, and the more common, less concentrated form, an aqueous solution, usually containing not less than 36% and not more than 37% of pure acetic acid. Originally produced from pyroligneous acid, obtained by destructive distillation of wood, it is now manufactured almost exclusively by routes of total synthesis, usually by conversion of acetylene to acetaldehyde, followed by oxidation to acetic acid. In this last-mentioned method, acetylene is passed into vessels of resistant alloy charged with dilute aqueous sulfuric acid containing suspended mercuric oxide, which acts as a catalyst for the union of acetylene with water to produce acetaldehyde, which forms with liberation of heat so that the optimum temperature of 60° to 65° C. is easily maintained. The acetaldehyde so produced is warmed in an aluminum vessel in the presence of another catalyst, such as manganese acetate, and air is bubbled through the solution at a rate of about 300 cubic feet per minute for each 1000 gallons of aldehyde solution. When the oxidation of the aldehyde to acetic acid has begun, cooling is necessary, for this reaction, too, is exothermic. Oxygen is completely absorbed from the air when the pressure is increased, and the desired product is formed in large quantities, being obtained in crude form as an aqueous solution containing various impurities that may be separated by distillation.

Other methods for making acetic acid include very rapid fermentation of molasses to weak alcohol, which then is passed through percolators filled with beech wood shavings inoculated with the micro-organism Mycoderma aceti; catalytic vapor phase oxidation of ethanol to acetaldehyde, followed by further oxidation of the acetaldehyde to acetic acid; and catalytic reaction of carbon monoxide with methanol, using a thorium oxide gel catalyst.

The reaction product obtained by each of these processes is a crude mixture of acetic acid with various impurities and by-products, from which the acid must be separated to obtain the pure product. These impurities commonly include methanol, formic acid, acetone, water and various organic, easily oxidizable substances, boiling near the boiling point of acetic acid, which are very difficult to separate from the acid by distillation merely. It has been found that, although it is possible to separate the major portion of these impurities by distillation, the partially purified product so obtained still contains small, but troublesome and objectionable, quantities of low-boiling easily oxidizable impurities, especially when it is obtained as the product of a continuous process of synthesis.

Acetic acid to be used in medicinal and/or food preparations, and to be used in organic synthesis, must be substantially free of these easily oxidizable impurities. For instance, to meet established standards for medicinal uses, a 4 cubic centimeters sample of aqueous acetic acid solution (ca. 36% by weight), mixed with 20 cubic centimeters of distilled water and 0.3 cubic centimeter of 0.1 N potassium permanganate solution, must not change its color to brown immediately, nor lose its pink coloration entirely in less than one-half minute, if the acid is to be acceptable for these uses; likewise, a 2 cubic centimeters sample of the glacial acid, when mixed with 10 cubic centimeters of water and 0.1 cubic centimeter of 0.1 N potassium permanganate solution, must not change its color to brown within two hours, if the product is to be acceptable.

It has been proposed to remove easily oxidizable impurities by treatment of crude acetic acid with suitable oxidizing agents, such as potassium permanganate, dichromate or the like, whereby the impurities would be oxidized and, thereby, destroyed or rendered innocuous. This procedure for purifying the acid presents certain difficulties that are not easily overcome. Treatment of the crude acid with the oxidizing agents in solid form is dangerous, as the reaction is exothermic and very difficult to control; hence, the hazard of an explosion ever is present. Treatment of the crude acid with aqueous solutions of the oxidizing agents has the disadvantage that the volume of the liquid product which subsequently must be handled and distilled is materially increased, with resultant dilution of the acetic acid content of the mixture. The use of acetic acid solutions of the oxidizing agents fails to provide an acceptable solution to this difficulty, as the solubility of the agents in this solvent is not great; hence, again, large volumes of solutions must be handled and processed, especially when the crude acid contains large proportions of impurities. Moreover, most of the vessels of the type commonly employed in distillation of acetic acid are made of copper or lined with copper, and this metal is severely corroded by action of oxidizing agents; thus, it is necessary to use special equipment for this purification procedure, not made of copper, or accept the need for frequent replacement of the copper equipment used.

One of the objects of this invention is to provide a method for obtaining acetic acid in a state of high purity, that obviates use of oxidizing agents, with the attendant disadvantages above mentioned, while yielding a product substantially free of easily oxidizable impurities.

Another object of this invention is to provide an improved method for purifying acetic acid and removing easily oxidizable impurities therefrom, wherein no foreign materials are introduced into the crude acid nor is its volume increased, and which yields the desired pure product by a procedure that may be operated continuously in integrated relationship to a continuous process for making the crude acid.

Another object of this invention is to provide a purification procedure for making substantially pure acetic acid that is simple, free of operating hazards and dangers, and that may be practiced without need for use of elaborate or highly specialized equipment or for use of skilled labor.

Other advantages of the process of this invention will be apparent hereinafter as the detailed description of the invention proceeds.

In accordance with this invention, it is found that crude acetic acid may be separated from easily oxidizable and other impurities, without necessity for use of oxidizing agents, by fractional vacuum distillation, using a vertical fractionating column, the impure acid in liquid state being introduced into the upper part of the column, preferably into approximately the middle zone of the upper half, and the substantially pure acid being withdrawn in vapor state from a lower zone near the middle, approximately, of the column. The lower boiling fractions, containing merely small proportions of acetic acid, pass in vapor phase to the top of the column for recycling, while the higher boiling and non-volatile components of the crude acid are discharged in liquid phase from the base of the column. Operation at a vacuum of about 200 millimeters of mercury pressure has been found to be satisfactory. To assure obtaining a product of the highest purity, it is necessary to maintain the temperature of that zone of the column positioned intermediate the zone at which the impure acid in liquid phase enters the column and the zone at which the pure acid is withdrawn from the column in vapor phase, at the boiling point of pure acetic acid at the pressure prevailing within the column. In this manner, a blocking zone, in effect, is provided which prevents downward movement of the volatilized, low-boiling, first runnings and thereby prevents these components from contaminating the pure acetic acid withdrawn at the bottom of this blocking zone. By suitable adjustment of the rate of crude acid input, pure acid output and fractionating column temperatures as will be understood by those skilled in the arts of distillation, acetic acid of a very high degree of purity is obtained.

To facilitate a fuller and more complete understanding of the matter of this invention and how the process in accordance therewith best may be practiced, a drawing is appended and a description thereof as well as a specific example herewith follows, but it is clearly to be understood that this drawing and example are provided by way of illustration, merely, and are not to be construed as imposing any limitation upon the invention as defined in the claims.

The one figure of the drawing is a schematic illustration of a column suitable for performing the process according to the invention. Numeral 1 designates the distilling part of the column and numeral 2 designates the concentrating part of the column. Numeral 6 designates the top of the distilling part where a thermometer 6' is provided. The cross section of the part 1 is reduced at the zone 4 which is below the top of the distilling part and from which pure acetic acid is withdrawn in vapor state through a valve 5. The latter serves for regulating the amount of acetic acid vapor which is needed for heating the admitted acetic acid and for evaporating the first runnings. The impure acid is admitted through a pipe 7. Numeral 8 designates a dephlegmator at the top of the column from which the first runnings are removed through an overflow pipe 3. The last runnings are withdrawn from the bottom of the column through a pipe 9.

The apparatus is operated as follows:

The body of the column is filled with impure acetic acid. The pressure in the column is preferably adjusted to amount to about 200 millimeters of mercury. The acetic acid is heated until distillate leaves through the pipe 3. By means of cooling the dephlegmator 8 and heating the body of the column a temperature is maintained at the zone 6 which corresponds approximately to the boiling point of the acetic acid. Thereupon the valve 5 is opened and impure acetic acid is supplied through the pipe 7. The valve 5 and the supply of extraneous heat are so adjusted that the desired amounts of distillate are obtained at the pipe 3 and at the zone 4 (valve 5). The amount of distillate flowing through pipe 3 and through the valve 5 must be substantially the same as the amount of impure acid supplied through pipe 7. By maintaining the boiling temperature of acetic acid in the zone 6 escape of rests of first runnings below the zone 6 is prevented so that only pure acetic acid is distilled at the zone 4. The amount of distillate at the top of the column depends on the degree of contamination of the raw acid and on the degree of purity of the distillate at the zone 4. The content of acetic acid of the distillate at the top of the column is held as low as possible by suitable cooling of the dephlegmator. By suitable adjustment of the supply of heat, of the valve 5, of the amount of raw acetic acid supplied through the pipe 7, and of cooling of the dephlegmator the column can be so operated that the volatile impurities are removed at the top together with some acetic acid and pure acetic acid is distilled at the middle, while a certain amount of retort residues are removed continuously or intermittently from the bottom of the column.

*Example*

A crude acetic acid mixture, obtained from oxidation of acetaldehyde and containing about 0.5% of impurities boiling at temperatures below the boiling point of pure acetic acid and about 0.2% of higher boiling impurities, is introduced while in liquid phase into an intermediate but upper zone of a vertical vacuum fractionating column, maintained at an internal pressure of about 200 millimeters of mercury. The column temperatures was adjusted so that about 10% of the crude acid input is passed from the top of the column and recycled, and a volume approximating 5% of the input is withdrawn from the base of the column, the remainder being discharged from the column in vapor phase as substantially pure acetic acid from the lower portion of a zone whose temperature is maintained substantially at the boiling temperature of acetic acid and which zone is interposed between the zone into which the impure acetic acid is introduced and the point where the pure acetic acid is removed from the column. The so produced pure acetic acid product solidifies at a temperature of 16.5° C. and, when mixed with potassium permanganate standard test solution, decolorizes, within a test period of three minutes, merely 0.02 gram of potassium permanganate per liter of acid at 20° C. The product is suitable for use in medicinal preparations and in foods.

Having thus described the subject matter of this invention, what it is desired to secure by Letters Patent is:

1. Process for the manufacture of acetic acid in a state of high purity from a crude acetic acid mixture containing volatile, easily oxidizable impurities boiling near the boiling point of pure acetic acid, that comprises introducing the crude acid while in liquid phase into an intermediate but upper first zone of a vertical fractionating column while maintaining the internal pressure of the column at a subatmospheric pressure; maintaining a second zone within the column, located immediately below and in communication with the first zone, at a controlled temperature substantially equalling the boiling point of pure acetic acid at the pressure maintained within the column; withdrawing substantially pure acetic acid in vapor phase from the lower portion of the controlled temperature zone near the middle of the column; withdrawing low boiling components from the top of the column; and discharging higher boiling and non-volatile components in liquid phase from the base of the column.

2. Process as defined in claim 1, further characterized in that the pressure maintained within the column is that of approximately 200 millimeters of mercury.

References Cited in the file of this patent

UNITED STATES PATENTS

| 436,764 | Barbet | Sept. 16, 1890 |
| 1,912,010 | Ricard | May 30, 1930 |

FOREIGN PATENTS

| 814,621 | France | Mar. 22, 1937 |